United States Patent
Wan et al.

(10) Patent No.: US 9,208,824 B2
(45) Date of Patent: Dec. 8, 2015

(54) INDEX TABLE GENERATION IN PVR APPLICATIONS FOR AVC VIDEO STREAMS

(75) Inventors: Wade Keith Wan, Irvine, CA (US); Jiang Fu, Irvine, CA (US); Sherman (Xuemin) Chen, San Diego, CA (US)

(73) Assignee: BROADCOM CORPORATION, Irvine, CA (US)

( * ) Notice: Subject to any disclaimer, the term of this patent is extended or adjusted under 35 U.S.C. 154(b) by 2318 days.

(21) Appl. No.: 10/847,834

(22) Filed: May 18, 2004

(65) Prior Publication Data

US 2005/0259960 A1 Nov. 24, 2005

(51) Int. Cl.
| | | |
|---|---|---|
| *H04N 7/12* | (2006.01) | |
| *H04N 11/02* | (2006.01) | |
| *H04N 11/04* | (2006.01) | |
| *G11B 27/32* | (2006.01) | |
| *G11B 27/034* | (2006.01) | |
| *H04N 5/76* | (2006.01) | |
| *H04N 5/781* | (2006.01) | |
| *H04N 9/804* | (2006.01) | |

(52) U.S. Cl.
CPC ............ *G11B 27/329* (2013.01); *G11B 27/034* (2013.01); *H04N 5/76* (2013.01); *G11B 2220/20* (2013.01); *H04N 5/781* (2013.01); *H04N 9/8042* (2013.01)

(58) Field of Classification Search
USPC ............................ 375/240.01, 240.24, 240.25
See application file for complete search history.

(56) References Cited

U.S. PATENT DOCUMENTS

| | | | | |
|---|---|---|---|---|
| 5,121,205 | A | * | 6/1992 | Ng et al. ...................... 348/568 |
| 5,739,860 | A | * | 4/1998 | Hoshino et al. ............ 348/384.1 |
| 5,767,797 | A | * | 6/1998 | Yogeshwar et al. ............ 341/50 |
| 7,139,015 | B2 | * | 11/2006 | Eshkoli et al. ............. 348/14.07 |
| 7,162,093 | B2 | * | 1/2007 | Regunathan et al. ......... 382/233 |
| 2005/0031308 | A1 | * | 2/2005 | Fu et al. ......................... 386/94 |
| 2005/0053145 | A1 | * | 3/2005 | Hsu et al. ................. 375/240.16 |
| 2005/0105883 | A1 | * | 5/2005 | Holcomb et al. ............... 386/69 |
| 2006/0165232 | A1 | * | 7/2006 | Burazerovic et al. .......... 380/37 |

OTHER PUBLICATIONS

JVT Editors (T. Wiegand, G. Sullivan, A. Luthra), Draft ITU-T Recommendation and Final Draft International Standard of Joint Video Specification (ITU-T Rec. H.264 | ISO/IEC 14496-10 AVC):, JVT-G050rl, Geneva, May 2003.

* cited by examiner

*Primary Examiner* — Geepy Pe
(74) *Attorney, Agent, or Firm* — Foley & Lardner LLP; Joseph N. Ziebert; Helen H. Zhang

(57) ABSTRACT

One or more methods and systems of indexing an AVC video stream are presented. In one embodiment, the method comprises identifying one or more fields within a picture of an AVC video stream. In one embodiment, a field of the one or more fields indicates the beginning of each picture. In a second embodiment, a field of the one or more fields indicates a picture type of a picture. In a third embodiment, a field of the one or more fields indicates whether a picture is a reference or a non-reference picture. By determining that a picture is a non-reference picture, the picture may be discarded, thereby reducing the memory required to implement the indexing system while increasing the available memory size. In one embodiment, a system of indexing an AVC video stream comprises a control processor, a memory, and a set of instructions resident in the memory.

23 Claims, 3 Drawing Sheets

INDEX TABLE GENERATION IN PVR APPLICATIONS FOR AVC VIDEO STREAMS

RELATED APPLICATIONS/INCORPORATION BY REFERENCE

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

Personal Video Recorder (PVR) applications require the generation of index tables in order to indicate the location and type of each picture in a video stream. PVRs utilize index tables on digital video as a means to conveniently manipulate the video data by way of its hardware and software. The index tables are often stored in a storage device such as a hard drive. By utilizing these index tables, PVRs allow a user to employ one or more indexing techniques or trick modes that include time shifting, pausing and fast forwarding video to provide a more desirable viewing experience for the user. The generation of such index tables are a key component of any PVR application.

Unfortunately, the generation of such index tables may be an arduous task for AVC (Advanced Video Coding) formatted digital video streams because the AVC standard does not require the type of each picture to be coded at the picture level.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for one or more methods and systems to index the start or beginning of one or more pictures of an AVC video stream. Further aspects of the invention provide for a method and system of determining the type of picture in an AVC video stream. Other various aspects of the invention provide for increasing the available memory size of a system by assessing the use of a picture so that it may be discarded from memory after its presentation.

In one embodiment, a method of indexing one or more pictures transmitted in an AVC data stream comprises identifying a field of a slice of the one or more pictures of the AVC data stream, and determining a value provided by an identified field.

In one embodiment, a method of determining a picture type of a picture using one or more fields comprises locating the one or more fields within each of one or more slice headers of one or more slices, parsing the one or more fields, identifying one or more picture types associated with the one or more fields, determining if a first condition is satisfied, wherein the first condition assesses if each of the one or more picture types comprises a first picture type, generating a first picture type decision if the first condition is satisfied, determining if a second condition is satisfied, wherein the second condition assesses if at least one of the one or more fields comprises a second picture type, generating a second picture type decision if the second condition is satisfied, determining if a third condition is satisfied, wherein the third condition assesses if the one or more fields comprises a third picture type and not the second picture type, and generating a third picture type decision if the third condition is satisfied.

In one embodiment, a method of indexing an AVC video data stream comprises locating a first field that provides a value of the first macroblock of a slice, determining the value, locating a second field that provides a picture type indicator of the slice, and determining one or more picture types associated with the slice.

In one embodiment, a method of reducing the amount of memory required for indexing using an AVC video data stream comprises locating a field within a picture of one or more pictures of the AVC video data stream, reading the field, determining whether the picture is a reference picture or a non-reference picture based on the reading, storing the picture into a memory after its presentation, if the picture is a reference picture, and discarding the picture after its presentation, if the picture is a non-reference picture.

In one embodiment, a system of indexing an AVC video data stream comprises a control processor, a circuitry, a memory, and a set of instructions resident in the memory.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention may be found in a system and method of indexing AVC (Advanced Video Coding) video data streams. The one or more systems and/or methods presented herein conform or comply with Draft ITU-T Recommendation and Final Draft International Standard of Joint Video Specification (ITU-T Rec. H.264|ISO/IEC 14496-10 AVC), which is incorporated herein by reference in its entirety. The aforementioned specification may be obtained from ISO (International Organization for Standardization), Geneva, Switzerland.

In one embodiment, the method comprises identifying one or more fields within a picture of an AVC video stream. In one embodiment, a field of the one or more fields indicates the beginning of each picture. In a second embodiment, a field of the one or more fields indicates a picture type of a picture. In a third embodiment, a field of the one or more fields indicates whether a picture is a reference or a non-reference picture. By determining that a picture is a non-reference picture, the picture may be discarded after its presentation, thereby reducing the memory required to implement the indexing system while increasing the available memory size. In one embodiment, a system of indexing an AVC video stream comprises a control processor, a memory, and a set of instructions resident in the memory. The system may be termed an AVC indexing system. The AVC indexing system may be incorporated as a subsystem into a personal video recorder (PVR) in order to facilitate indexing of the AVC video stream.

Figure 1:
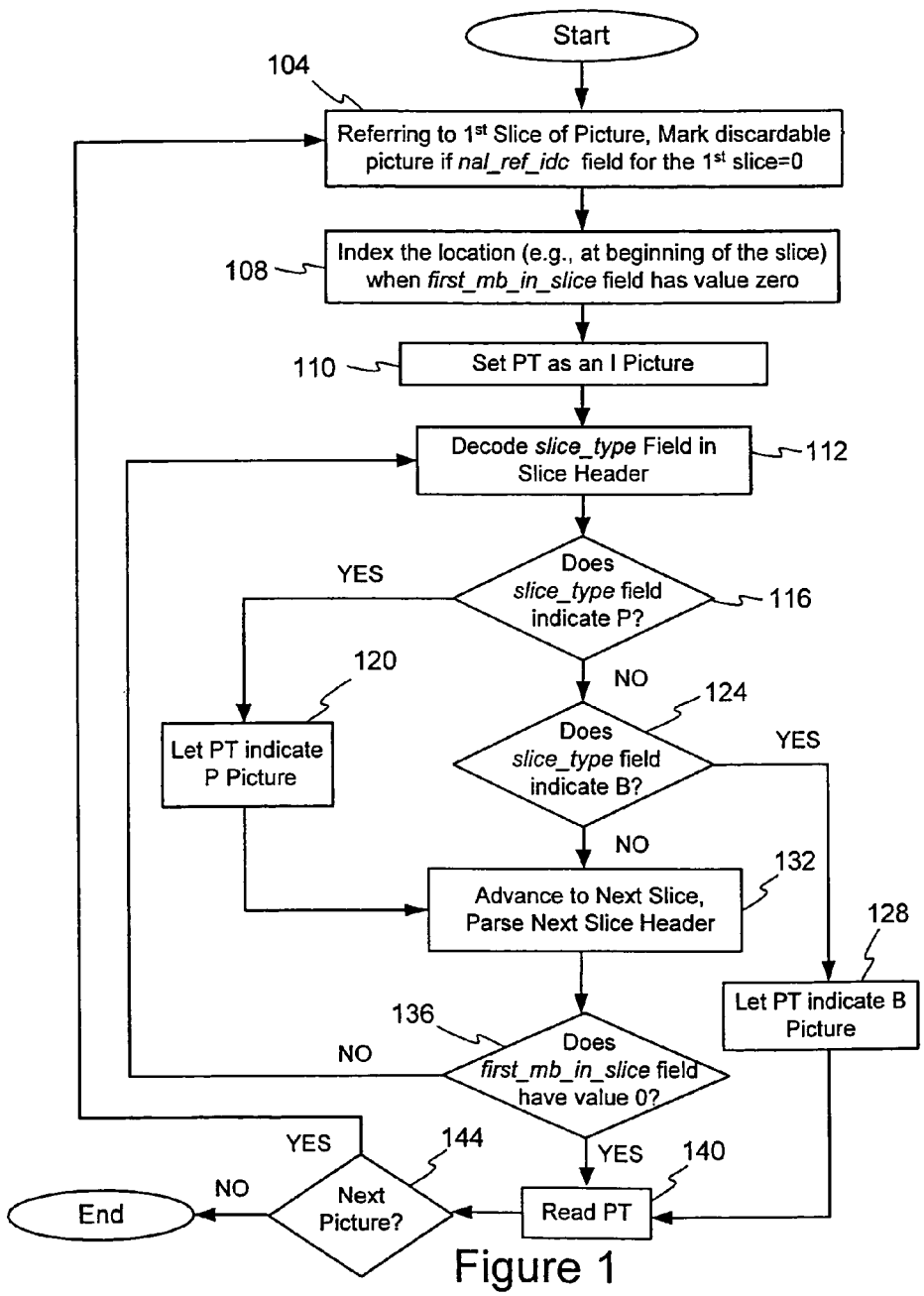
FIG. 1 is an operational flow diagram illustrating an algorithm used to index AVC video in accordance with an embodiment of the invention.

FIG. 1 is an operational flow diagram illustrating an algorithm used to index AVC video in accordance with an embodiment of the invention. At step 104, the algorithm parses a field within a picture that indicates whether the picture comprises a reference picture or a non-reference picture. The picture in which the field is parsed may comprise a first picture among one or more pictures of an AVC video stream. In one embodiment, the field is located within a NAL (network abstraction layer) unit header. In one embodiment, a reference or non-reference picture is indicated by the value of this field. In one embodiment, if the value of the field is zero, the value indicates that the picture is discardable (i.e., may be discarded after its presentation). On the other hand, a non-zero value, such as the value 1, indicates that the picture is not discardable. The field may comprise a field within a slice header of one or more slices of the picture. In one embodiment, the field may comprise a nal_ref_idc field in compliance with Draft ITU-T Recommendation and Final Draft International Standard of Joint Video Specification (ITU-T Rec. H.264|ISO/IEC 14496-10 AVC). Discarding such non-referenced pictures may reduce the memory required in the implementation of the AVC indexing system. Furthermore, discarding non-referenced pictures may increase the available memory size, thereby improving performance of the AVC indexing system and its memory dependent peripheral circuitry. During step 104, a non-reference picture may be marked as discardable using the exemplary nal_ref_idc field; as a result, it may be discarded from memory after being used. Such non-reference pictures are not used when decoding additional incoming pictures. At step 108, the location of a picture is indexed when a field within a slice of one or more slices in a picture indicates the beginning of the picture. In one embodiment, the field that indexes the start of a picture may comprise a first_mb_in_slice field in compliance with Draft ITU-T Recommendation and Final Draft International Standard of Joint Video Specification (ITU-T Rec. H.264|ISO/IEC 14496-10 AVC). For example, the location of the beginning of a picture is indexed when the contents of the first_mb_in_slice field equals the value zero. In reference to the aforementioned steps 104 and 108, the order of the steps may be interchanged such that indexing the location of a picture may occur prior to marking a picture discardable. At step 110, a variable, termed PT (i.e., implying picture type) is initialized with a value corresponding to an I picture. The variable, PT, is used to store one or more values that indicate picture type. The picture type is indicated by examining one or more fields in a slice header of one or more slices in a picture. The field of the slice header is parsed and examined by the AVC indexing system. In the flow diagram of FIG. 1, the variable PT may correspond to a register or location within a memory of the AVC indexing system that stores a value that corresponds to a particular picture type. In one embodiment, the picture type may comprise a B, I, or P type of picture, as defined in Draft ITU-T Recommendation and Final Draft International Standard of Joint Video Specification (ITU-T Rec. H.264|ISO/IEC 14496-10 AVC). Prior to parsing and examining the first slice of the picture by the AVC indexing system, the variable PT, by default, stores a value that corresponds to an I picture. At step 112, the AVC indexing system performs a decode of a field of a slice in a picture; in one embodiment the field comprises a slice_type field. The slice may comprise a first slice of a picture of an AVC video stream. At step 116, the first slice of the picture is examined in terms of the picture type. For example, the contents of the slice_type field within the slice is examined to see if the associated picture is a P picture. If the slice_type field indicates that the picture type is a P type of picture, then the variable PT is set to a value that corresponds to that of a P picture, as illustrated in step 120. Otherwise, the process proceeds to step 124, in which, an assessment is made whether the slice indicates that the picture is a B picture. If the slice_type field indicates that the picture is indeed a B picture, the process proceeds to step 128, in which the variable PT is set to a value that corresponds to a B picture. Otherwise, at step 132, the next slice header of the next slice in the picture is parsed. Next, at step 136, the AVC indexing system determines if the next slice is the first slice in the next picture. In one embodiment, as previously mentioned, the start (or first slice) of a picture is indexed when the first_mb_in_slice field has value equal to zero. For example, the AVC indexing system decodes the data in the first_mb_in_slice field to determine if the slice corresponds to the first slice in the picture. If the first_mb_in_slice is not equal to zero, the next slice is not the first slice of the next picture, and the process jumps back to step 112, in which the slice type field of the next slice is decoded. If, on the other hand, the first_mb_in_slice field is equal to zero, the process proceeds at step 140. At step 140, the value of PT is read or decoded in order to determine the picture type. At step 144, the AVC indexing system determines whether additional picture(s) need to be processed by the AVC indexing system. If there are additional pictures, the process proceeds at steps 104/108, in which the discardability of a picture is ascertained and indexing of the starting location of the next picture is performed. Otherwise, if the current picture comprises the last picture in the AVC video stream, the process ends.

The following table provides an example of the values of the parameters (or variables) used in the algorithm previously described in FIG. 1. These parameters comprise the first_mb_in_slice, slice_type, and nal_ref_idc fields.

TABLE #1

| | Picture 0 (I-Picture) | | | Picture 1 (B-Picture) | | | Picture 2 (P-Picture) | | | Picture 3 (B-Picture) | | | |
|---|---|---|---|---|---|---|---|---|---|---|---|---|---|
| first_mb_in_slice | 0 | 4 | 21 | 0 | 15 | 28 | 0 | 10 | 20 | 0 | 5 | 15 | 24 |
| slice_type | I | I | I | B | P | B | I | P | P | P | B | I | P |
| nal_ref_idc | 1 | 1 | 1 | 0 | 0 | 0 | 1 | 1 | 1 | 0 | 0 | 0 | 0 |
| Slice Parsed By Algorithm | 1 | 2 | 3 | 4 | | | 5 | 6 | 7 | 8 | 9 | | |
| Discardable picture | No | | | Yes | | | No | | | Yes | | | |

Table #1 comprises five rows. The first row comprises entries that provide the macroblock number of the first macroblock in each slice of a picture. As indicated in Table #1, the first macroblock of each slice is indexed. For example, picture #0 has three slices, in which, the first macroblock of the three slices are located at macroblock #0, #4, and #21. The second row comprises entries that provide the slice type of a particular slice as determined by the slice_type field in the slice header of a picture. As illustrated in Table #1, picture #0 comprises an I picture because, the slice_type field of each slice indicates that the picture type is an I picture. In picture #1, for example, the picture is determined to be a B picture immediately because the first slice indicates that the picture type is a B picture. The third row comprises entries that provide an indication whether the slice is associated with a reference picture or a non-reference picture. As discussed previously, if the picture is determined to be a non-reference picture, it may be discarded after presentation. Otherwise, the picture is a reference picture that may be utilized in the decoding of subsequent pictures. As illustrated in Table #1, the values for the nal_ref_idc field are consistent throughout all slices within a picture. As mentioned earlier, when nal_ref_idc=0, the picture is discardable. The fourth row comprises entries that indicate the slice number parsed by the algorithm. As illustrated in Table #1, the second and third slices of picture #1 are not parsed and analyzed because the first slice has determined that picture #1 is a B picture. Hence the picture is categorized as a B picture, and the process proceeds with the reading of the next picture (picture #2). As soon as the algorithm determines the picture is a B picture, additional slices in the picture need not be analyzed, and the algorithm jumps to the next picture. This may be further observed using the second slice of picture #3; the picture is determined to be a B picture at the second slice. As a consequence, the third and fourth slices of picture #3 do not need to be further parsed and analyzed. In reference to picture #2, all slices are parsed and analyzed since there are no slices that indicate the picture is a B type of picture. Picture #2 is categorized as a P picture since there is at least one slice that indicates that picture #2 is a P picture while there are no slices that indicate that picture #2 is a B picture. The fifth row of Table #1 indicates whether the associated picture is discardable, and is directly related to the third row of Table #1. For example, if nal_ref_idc=0 as shown in picture #1, the picture is discardable, and is indicated by a "yes". In another example, if nal_ref_idc=1, as shown in picture #2, the picture is not discardable, and is indicated by a "no".

Figure 2:
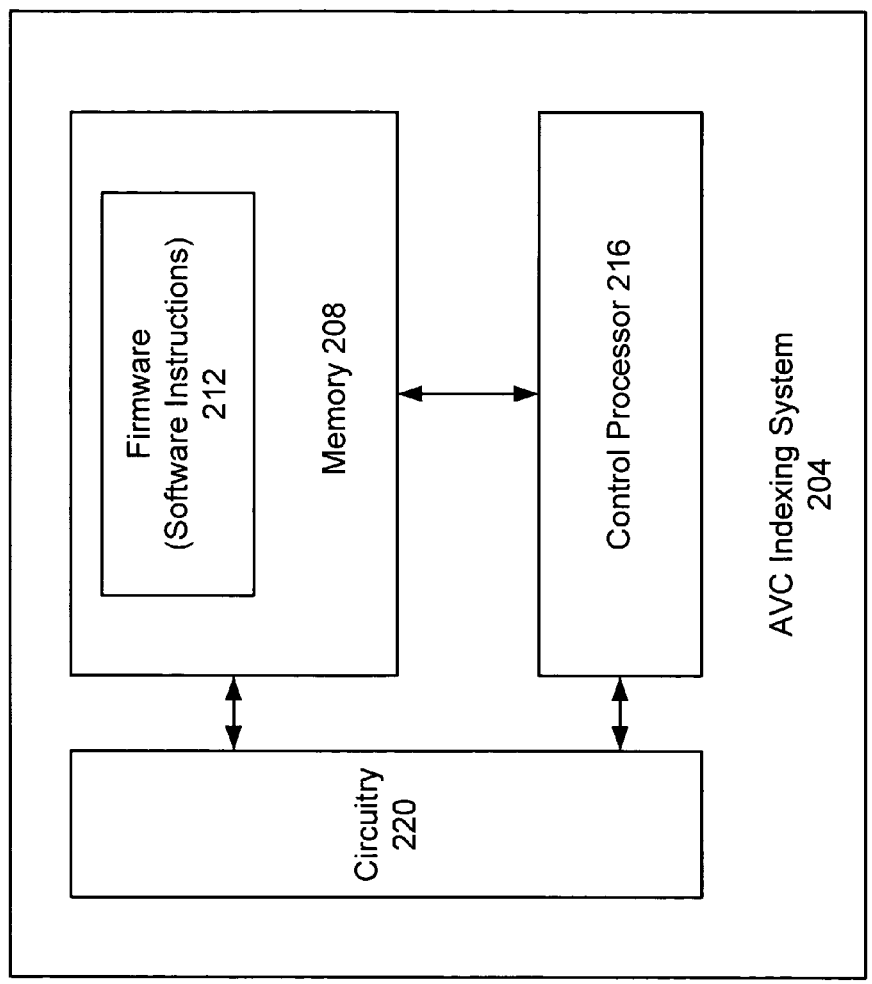
FIG. 2 is a block diagram of an AVC indexing system in accordance with an embodiment of the invention.

FIG. 2 is a block diagram of an AVC indexing system 204, in accordance with an embodiment of the invention. The AVC indexing system 204 comprises a memory 208, a control processor 216, and circuitry 220. As shown, a set of software instructions or firmware 212, resident in the memory 208, is executed by way of processing performed by the control processor 216. AVC video data may be received and processed by the circuitry 220 by way of execution of the firmware 212 resident in the memory 208. The memory 208 may comprise a read only memory (ROM) such as a non-volatile ROM. The circuitry 220 may comprise one or more interfaces and logic devices used in the processing of data in relation to the operational flow diagram of FIG. 1. The firmware 212 may facilitate data processing of the AVC video stream in relation to the steps performed in FIG. 1. Use of the AVC indexing system 204 facilitates the indexing of picture position, picture type, and discardability information of one or more pictures in an AVC video stream. In addition, the circuitry 220 may comprise one or more logic devices that facilitate the generation of a PVR index table that incorporates the picture position information, picture type, and discardability information. The PVR index table is stored in a storage device such as a hard disk drive.

Figure 3:
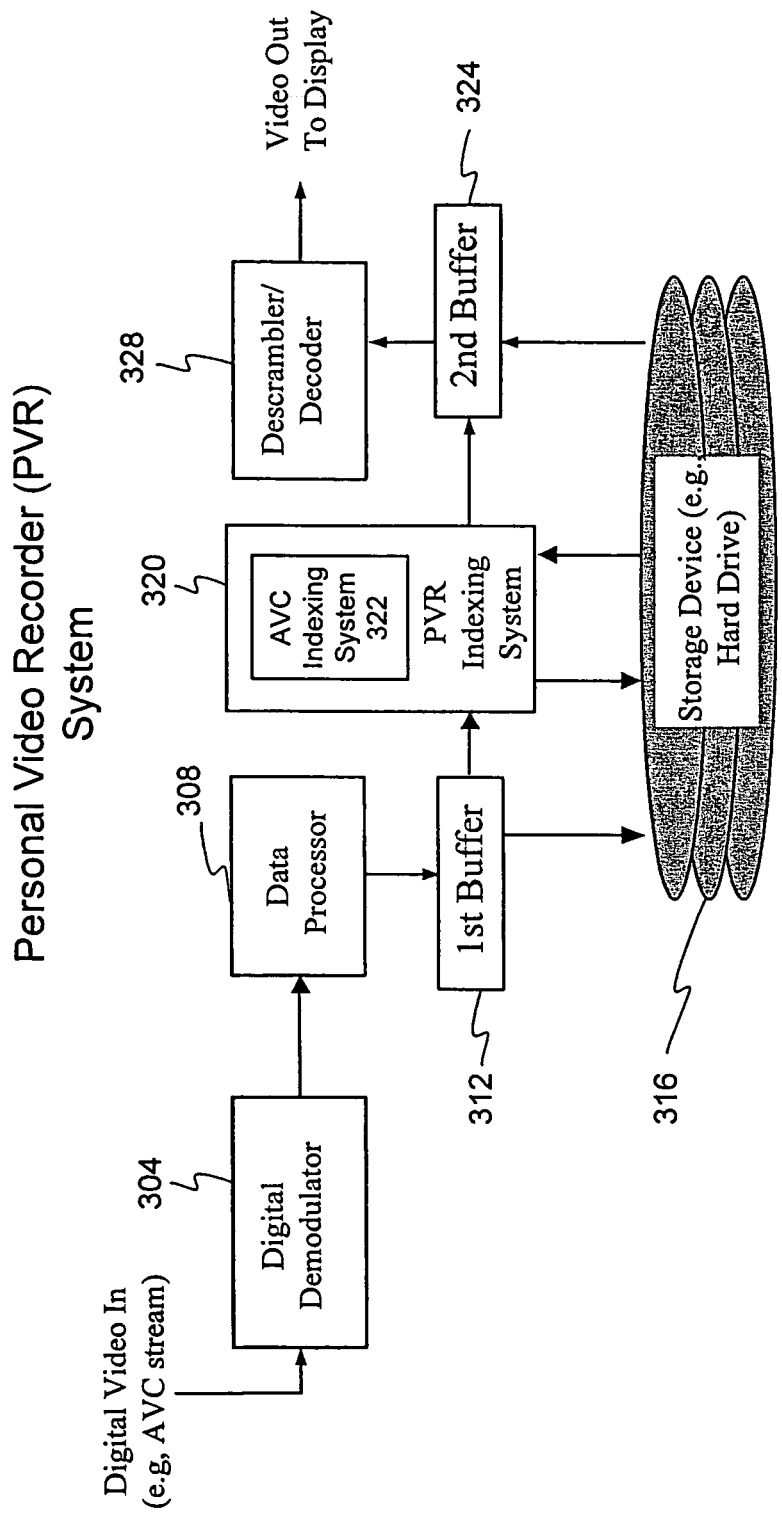
FIG. 3 is a relational block diagram of a personal video recorder (PVR) system incorporating the AVC indexing system referenced in FIG. 2, in accordance with an embodiment of the invention.

FIG. 3 is a relational block diagram of a personal video recorder (PVR) system incorporating the AVC indexing system referenced in FIG. 2, in accordance with an embodiment of the invention. The PVR system comprises a digital demodulator 304, a data processor 308, a first data buffer 312, a storage device 316, a PVR indexing system 320 comprising the AVC indexing system 322, a second data buffer 324, and a descrambler/decoder 328. As illustrated in FIG. 3, a digital video stream is input in the digital demodulator 304. In one embodiment, the digital video stream comprises an AVC (i.e, H.264 or JVT) type of digital video stream. The AVC video stream may be received from a telecommunications operator or carrier. One or more selectable video programs or channels may be delivered from the AVC video stream. In this embodiment, the digital demodulator 304 functions to demodulate a received digital video stream to an appropriate baseband signal. Thereafter, the baseband video signal is received by a processor such as the data processor 308. The data processor 308 selects a particular program or channel by filtering out AVC video data, for example, and subsequently decrypting the filtered data. Next, the data processor 308 may reconfigure the filtered data and subsequently store the reconfigured data in the first data buffer 312. The first data buffer 312 facilitates recording or writing of the filtered AVC data into the storage device 316. The storage device 316 may comprise an exemplary hard disk drive or other comparable device.

While recording to a storage device 316, the AVC indexing system 322 may optionally employ the algorithm described and referenced in FIG. 1, in order to effectively and efficiently index, type, and determine the discardability of the one or more pictures received from the AVC video stream. The values of the parameters of the algorithm (described in reference to FIG. 1) may be stored within the storage device 316. For example, the start (or beginning) of the one or more pictures may be determined, and its position information may be stored in the storage device 316 by way of control provided by the AVC indexing system 322. In addition, a picture's picture type (I, P, or B) and its discardability may be stored in the storage device 316. Information such as position information, picture type, and discardability attributes may be used to generate a PVR index table. The index table, of course, is used to facilitate various trick modes and indexing techniques. The AVC indexing system 322 facilitates the generation of the index table, improving AVC video playback functionality and operational performance of the PVR system. The PVR indexing system 320 may comprise one or more types of indexing systems, in addition to the AVC indexing system 322. The second buffer 324 facilitates delivery of AVC video data into the descrambler/decoder 328. Any timing changes resulting from control provided by the PVR indexing system 320 or AVC indexing system 322 are obviated using the second buffer 324. The selected program or channel is subsequently descrambled/decoded by the descrambler/decoder 328. Thereafter, the program or channel is displayed by a monitor or television or any appliance capable of visually providing the selected video to a viewer. It is contemplated that one or more of the elements 304, 308, 312, 316, 320, 322, 324, 328 described in FIG. 3 may be incorporated into a set-top-box in order to interface and process any AVC data stream provided by the telecommunications operator.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of indexing one or more pictures transmitted in an AVC data stream, comprising:
    identifying, using one or more processors, a first field of a slice of one or more slices within a picture of the one or more pictures of the AVC data stream;
    determining, using the one or more processors, whether the first field of the slice equals a value, the value being a fixed value;
    identifying, using the one or more processors, a position of the first field as at a beginning of the picture when the first field equals the value, and identifying the position of the first field as at a position other than the beginning of the picture when the first field is not equal to the value;
    locating a second field of the slice that provides a reference picture indicator of the slice;
    determining whether the picture is a discardable picture using the reference picture indicator; and
    storing at least one of:
    position information associated with the first field based on the identification of the position, or
    the picture in response to the picture not being a discardable picture.

2. The method of claim 1, wherein the indexing indicates the beginning of each picture in the one or more pictures.

3. The method of claim 1, wherein the first field comprises a field that provides the value of the first macroblock in the slice.

4. The method of claim 3, wherein the first field comprises a first_mb_in_slice field as defined in ITU-T Rec. H.264|ISO/IEC 14496-10 AVC.

5. The method of claim 1, wherein the fixed value comprises the value zero.

6. A method comprising:
    locating, using one or more processors, a first field that provides a value of a first macroblock of a slice of one or more slices of a picture;
    determining, using the one or more processors, the value;
    locating, using the one or more processors, a second field that provides a picture type indicator of the slice;
    determining, using the one or more processors, a picture type of the slice using the picture type indicator of the slice;
    locating a third field that provides a reference picture indicator of the slice; and
    determining whether the picture is a discardable picture using the reference picture indicator; and
    indexing an AVC video data stream using at least one of the value, picture type, or the determination of whether the picture is a discardable picture.

7. The method of claim 6, wherein the first field comprises a first_mb_in_slice field as defined in ITU-T Rec. H.264|ISO/IEC 14496-10 AVC.

8. The method of claim 6, wherein the second field comprises a slice_ type field as defined in ITU-T Rec. H.264|ISO/IEC 14496-10 AVC.

9. The method of claim 6, wherein the third field comprises a nal_ref_idc field as defined in ITU-T Rec. H.264|ISO/IEC 14496-10 AVC.

10. A method comprising:
    locating, using one or more processors, a field that provides a reference picture indicator of a slice of one or more slices of a picture;
    reading, using the one or more processors, the reference picture indicator in the field;
    determining, using the one or more processors, whether the picture is a reference picture or a non-reference picture using the reference picture indicator;
    storing the picture into a memory, after its presentation, when the picture is a reference picture; and
    discarding the picture from memory when the picture is a non-reference picture.

11. The method of claim 1, wherein a third field of the slice is used to determine whether the slice corresponds to one of: an I, B, or P picture.

12. The method of claim 11, wherein the determining whether the slice corresponds to one of: an I, B, or P picture is used to determine whether the picture of the slice is discardable.

13. The method of claim 1, wherein the position information is stored as an index table within a hard disk drive.

14. A system for indexing one or more pictures transmitted in an AVC data stream, comprising:
    a memory storing a set of instructions; and
    a processor configured to execute the set of instructions, the set of instructions when executed by the processor, causing the processor to:
    identify a first field of a slice of one or more slices within a picture of the one or more pictures of the AVC data stream;
    determine whether the first field of the slice equals a value, the value being a fixed value;
    identify a position of the first field as at a beginning of the picture when the first field equals the value, and identify the position of the first field as at a position other than the beginning of the picture when the first field is not equal to the value;
    locate a second field of the slice that provides a reference picture indicator of the slice;
    determine whether the picture is a discardable picture using the reference picture indicator; and
    store at least one of:
    position information associated with the first field based on the identification of the position, or
    the picture in response to the picture not being a discardable picture.

15. The system of claim 14, wherein the indexing indicates the beginning of each picture in the one or more pictures.

16. The system of claim 14, wherein the first field comprises a field that provides the value of the first macroblock in the slice.

17. The system of claim 16, wherein the first field comprises a first_mb_in_slice field as defined in ITU-T Rec. H.264|ISO/IEC 14496-10 AVC.

18. The system of claim 14, wherein the fixed value comprises zero.

19. The system of claim 14, wherein a third field of the slice is used to determine whether the slice corresponds to one of: an I, B, or P picture.

20. The system of claim 19, wherein the determining whether the slice corresponds to one of: an I, B, or P picture is used to determine whether the picture of the slice is discardable.

21. The system of claim 14, wherein the position information is stored as an index table within a hard disk drive.

22. The method of claim 10, wherein a personal video recorder (PVR) index table is generated based on whether the picture is a reference picture or a non-reference picture.

23. The method of claim 22, wherein the PVR index table is stored in a hard disk drive.

* * * * *